United States Patent [19]

Lang

[11] Patent Number: 4,913,249

[45] Date of Patent: Apr. 3, 1990

[54] AUXILIARY POWER STEERING MECHANISM, ESPECIALLY FOR MOTOR VEHICLES

[75] Inventor: Armin Lang, Schwäbisch Gmünd, Fed. Rep. of Germany

[73] Assignee: Zahnradfabrik Friedrichshafen, AG., Friedrichshafen, Fed. Rep. of Germany

[21] Appl. No.: 294,509

[22] PCT Filed: Jul. 14, 1987

[86] PCT No.: PCT/EP87/00380

§ 371 Date: Dec. 28, 1988

§ 102(e) Date: Dec. 28, 1988

[87] PCT Pub. No.: WO88/00545

PCT Pub. Date: Jan. 28, 1988

[30] Foreign Application Priority Data

Jul. 19, 1986 [LU] Luxembourg ............................... 426

[51] Int. Cl.[4] .............................................. B62D 5/04
[52] U.S. Cl. .................................. 180/79.1; 180/141; 180/142; 364/424.05
[58] Field of Search .................. 180/79.1, 141, 142, 180/148, 140, 143; 364/424.05

[56] References Cited

U.S. PATENT DOCUMENTS

| 4,476,529 | 10/1984 | Nakamura et al. | 364/424.05 |
| 4,573,545 | 3/1986 | Kalns | 180/79.1 |
| 4,703,821 | 11/1987 | Shimizu | 180/142 |

FOREIGN PATENT DOCUMENTS

| 8702631 | 5/1987 | World Int. Prop. O. | |
| 8702632 | 5/1987 | World Int. Prop. O. | 180/142 |

*Primary Examiner*—David M. Mitchell
*Assistant Examiner*—Anne Marie Boehler
*Attorney, Agent, or Firm*—Albert M. Zalkind

[57] ABSTRACT

In an electrically-assisted auxiliary power steering mechanism an electric motor (11) is controlled by a control circuit (9) according to an output signal X1) from a torque-measuring device (8). To prevent instances of faulty control a redundant safety circuit (14) with a safety device (15) and a switching device (16) controls a disconnecting element (13, 27) located between the electric motor (11) and the steering gear (1) that switches the electric motor (11) on and off. A second torque-measuring device (17) for measuring the torque of the electric motor (11) is disposed between the electric motor (11) and the steering gear (1). The switching device (16) of the safety circuit (14) activates the disconnecting element (13, 27) when the torques measured by the two torque-measuring devices (8, 17) have different directions.

8 Claims, 4 Drawing Sheets

4,913,249

AUXILIARY POWER STEERING MECHANISM, ESPECIALLY FOR MOTOR VEHICLES

BACKGROUND OF THE INVENTION

The invention is concerned with an auxiliary power steering mechanism, especially for motor vehicles.

An auxiliary power steering mechanism of a pertinent type is known from EP 0101579 A2. In the embodiment according to FIG. 8 of that document, an electro-magnetic coupling is located between the electric motor and the steering gear. The coupling curves to separate the motor from the stearing gear when the motor is not being provided with current. A mechanism is thus obtained by means of which steering can be activated purely mechanically, if there is a current failure, without having a couple in the electric motor. However, the known device provides no assurance of proper functioning if a malfunction occurs in the torque-measuring device or in the electronic control circuit. Such a malfunction could consist of an apparent torque being sensed in the torque-measuring device and the electric motor being started although the steering wheel has not been turned. As a result, the vehicle would suddenly swerve from straight line travel.

Such a malfunctioning could consist of the steering wheel being turned in one direction while the electronic control device drives the electric motor in the opposite direction. In this case, too, the coupling would close, so that the electric motor would act fully on the steering mechanism.

OBJECT AND SUMMARY OF THE INVENTION

The object of the invention is to create an auxiliary power steering mechanism in which the electric motor cannot exert an undesired torque on the steering mechanism in case of malfunctioning.

By means of the installation of an additional, redundant safety circuit along with the control circuit and the installation of a second torque-measuring device that measures the motor torque, the correlation of the two moments can be checked and a disconnecting element can be actuated in case of a malfunction. Thus, a faulty controlling of the electric motor is prevented.

The safety circuit arrangement can be obtained in an especially easy manner by letting the safety device of the safety circuit have two signal outlets, one of which is always used, through the two switches of the switching device, to activate the coupling or the disconnecting switch when operation of the steering mechanism is troublefree. The two switches are actuatable, by turns, by the second torquemeasuring device. It is advantageous for the switches to be mechanically actuatable.

Having the disconnecting element closed before the engine starts or receives the signal to start is achieved by the different levels of the actuation thresholds of the safety device and the control device.

In order to be able to recognize an incident of malfunctioning in the safety device in time, a monitoring device in the form of an AND gate is located between the two signal outlets. An indicator is activated by it when both signal outlets deliver a torque signal.

To raise the safety redundancy even higher, an electronic monitoring device is located between the control circuit and the safety circuit by means of which the signals of the two circuits are compared with each other and the control circuit and/or the coupling are disconnected when the torque signal values are different.

The invention will be explained in greater detail with the help of several embodiments represented in the following drawing.

BRIEF DESCRIPTION OF THE DRAWING

FIG. 1 is the preferred embodiment.

DETAILED DESCRIPTION

Figure 1:
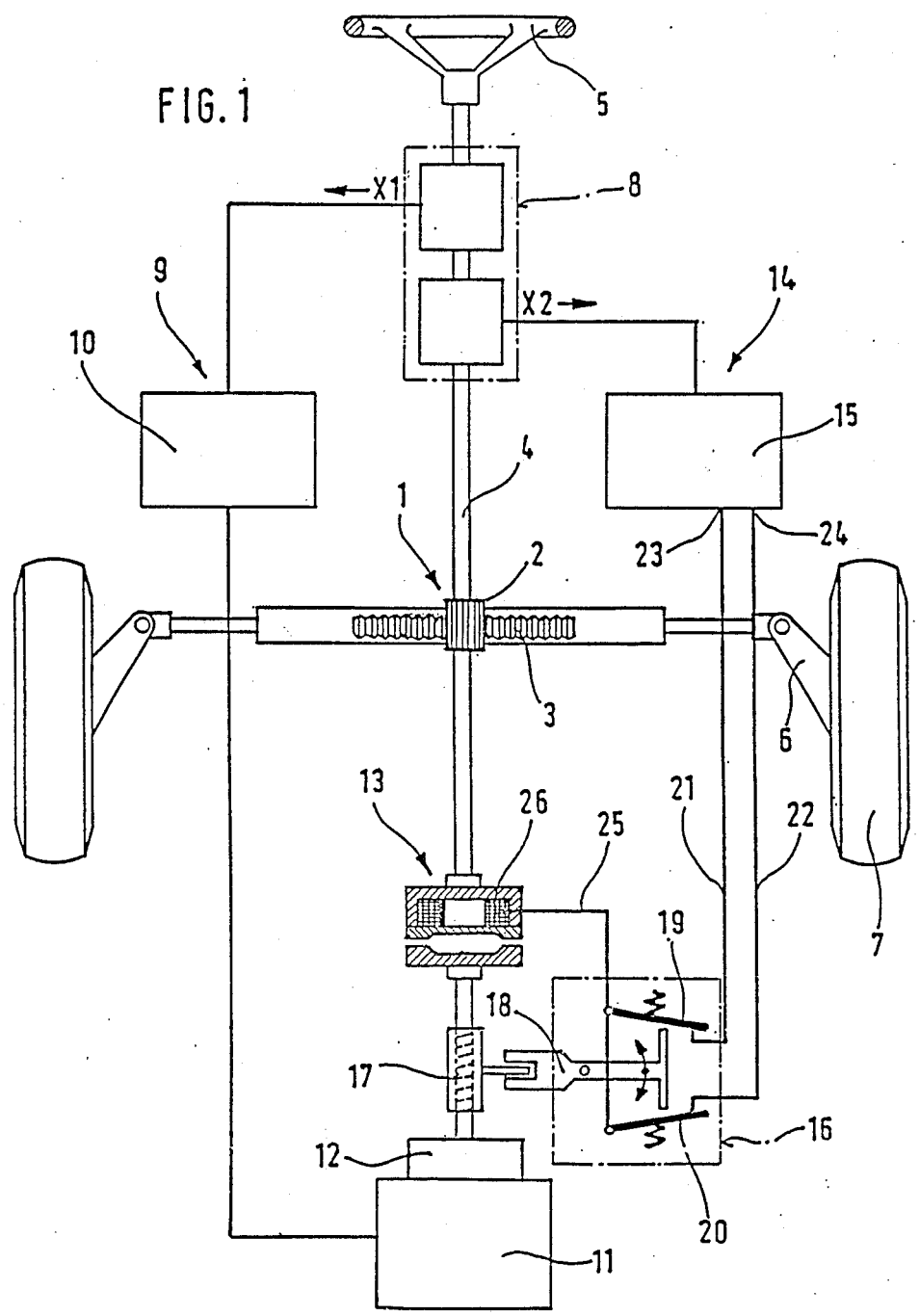
FIG. 1 shows a diagrammatic representation of the auxiliary power steering mechanism of the invention in a first embodiment with a coupling.

The mechanical part of the auxiliary power steering mechanism contains a steering gear 1, for example, a rack-and-pinion steering gear, whose primary part is formed by a pinion 2 and whose secondary part is formed by a steering rack 3. The pinion 2 is connected with a steering wheel 5 by a steering shaft 4. The steering rack 3 is connected with the vehicle wheels 7 that are to be steered by a steering linkage 6 in a known manner.

A torque-measuring device 8 is installed in the steering shaft 4. A control circuit 9 that receives a first output signal X1 from the torquemeasuring device 8 is attached to the torque-measuring device 8. The control circuit 9 contains an electronic control device 10.

An electric motor 11 is controlled by the control circuit 9, and it can be connected with a part of the steering gear 1 through a set of gears 12. In the embodiments in FIGS. 1 and 2, the electric motor 11 acts on the primary part, i.e., the pinion 2 of the steering gear 1. In the embodiment in FIG. 3, the electric motor 11 acts on the secondary part, i.e., the steering rack 3 of the steering gear 1.

A coupling 13 is located between the electric motor 11 and the steering gear 1. The coupling 13 is controlled by a redundant safety circuit 14 in accordance with a second output signal X2 from the first torquemeasuring device 8. The safety circuit 14 contains a safety device 15 and a switching means 16. A second torque-measuring device 17 for measuring the torque of the electric motor 11 is located in the drive train between the electric motor 11 and the steering gear 1. A switch lever 18 is connected with the second torque-measuring device 17 to activate two switches 19 and 20 comprised in the switching means 16, preferably mechanically. Two switches 19 and 20 are connected, on the one hand, with two signal outputs 23 and 24 of the safety device 15 through two lines 21 and 22 of the safety circuit and, on the other hand, with a solenoid 26 of the coupling 13 through a common line 25. The switches 19 and 20 are closed in there neutral position, as shown.

Figure 2:
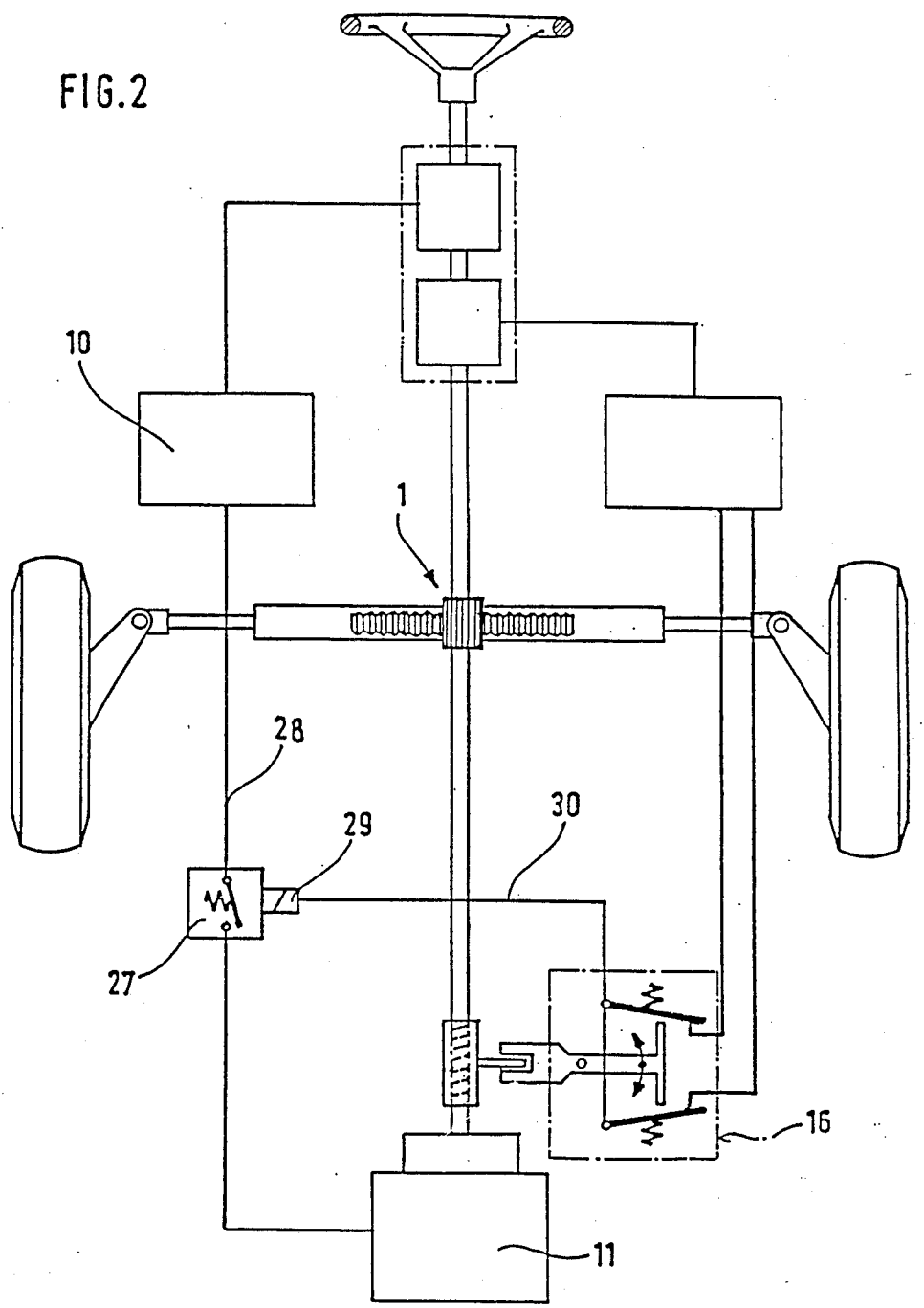
FIG. 2 shows a second embodiment of the auxiliary power steering mechanism with a disconnecting switch instead of the coupling.

In the embodiment according to FIG. 2, the disconnecting element is formed by a disconnecting switch 27 that replaces the coupling 13. The electric motor 11 is then connected directly with the pinion 2 of the steering gear 1. The disconnecting switch 27 is located in a line 28 running from the control device 10 to the electric motor 11. The disconnecting switch 27 is controlled by a magnetic coil 29 through a line 30 from the switch 16. The rest of the construction corresponds to that of the embodiment in FIG. 1.

Figure 3:
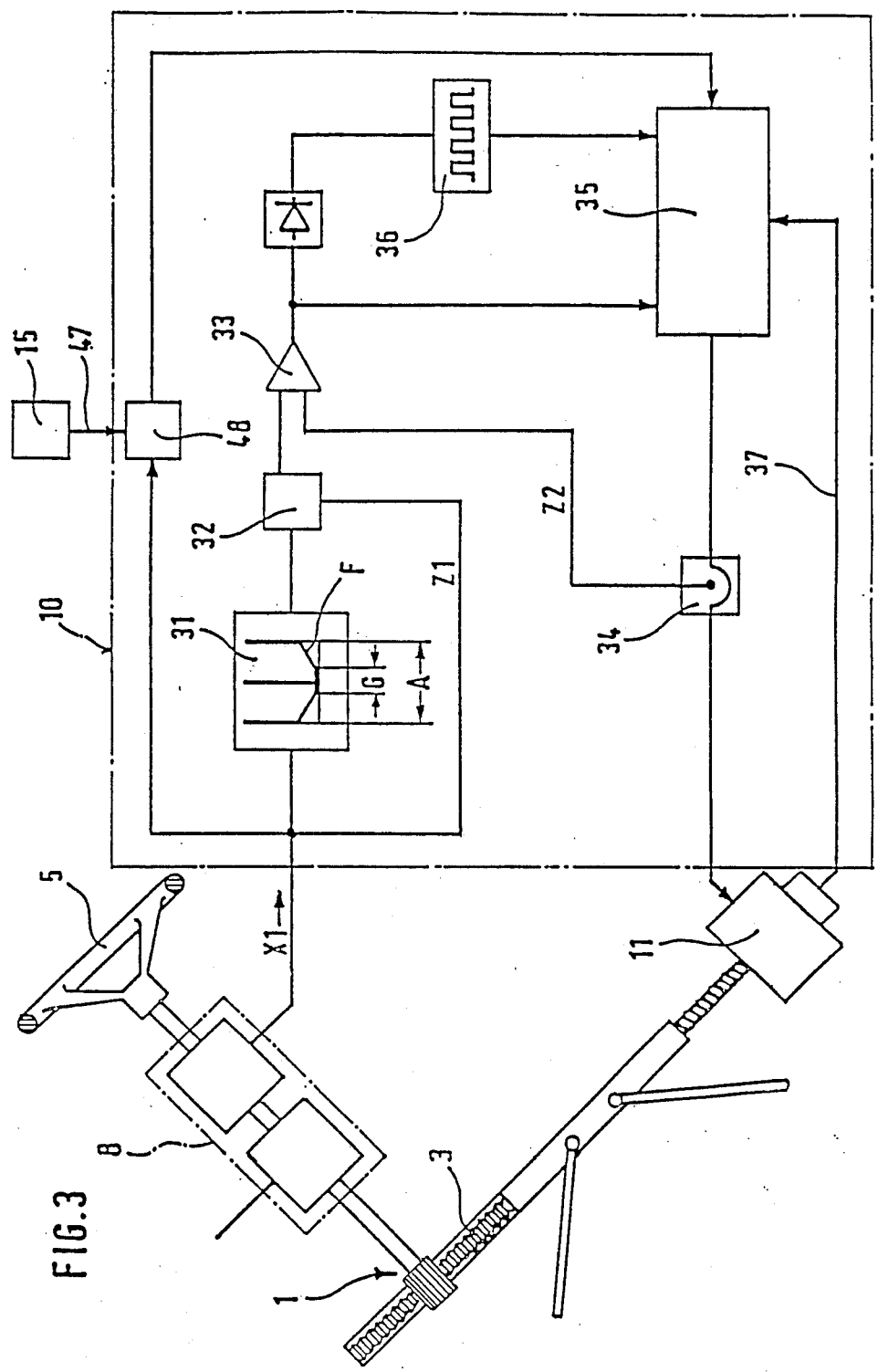
FIG.3 shows a block wiring diagram of the control circuit with the connection of steering gear and electric motor in accordance with a third embodiment.

According to FIG. 3, the first output signal X1 of the first torque-measuring device 8 is conveyed to a characteristic curve generator 31 in the control device 10 by actuation of the steering wheel 5. This characteristic curve generator 31 reshapes the torque signal X1 in such a way that a signal does not appear at its outlet until a certain limiting force threshold G is exceeded. If this threshold is reached, the signal Y rises in the operating range F with the rising torque. If the torque exceeds a certain value A, the signal Y rises very steeply into the cut off range. This characteristic curve corresponds to the "servo pressure as a function of the actuation moment at the steering wheel" characteristic curve of a normal hydraulic auxiliary power steering mechanism.

In the desired value control stage 32 adjoining the characteristic curve generator 31, the second quadrant is shifted into the third quadrant with the help of the right/left information Z1 of the first torque measuring device 8 in the above-mentioned characteristic curve, as a result of which a desired value is obtained with direction of rotation information. This desired value is then compared with the current actual value signal Z2 of Servomotor motor 11 measured with current sensor 34 by an actual desired value comparator 33.

The output of the actual desired value comparator controls an output end stage 35 that, because of its better efficiency, advantageously works according to the principle of pulse width modulation 36. When an electric motor 11 without a commutator is used, the rotor position of the electric motor 11 is returned to the output end stage 35 by means of a line 37. This feedback can be omitted when a direct current motor with a commutator is used.

Figure 4:
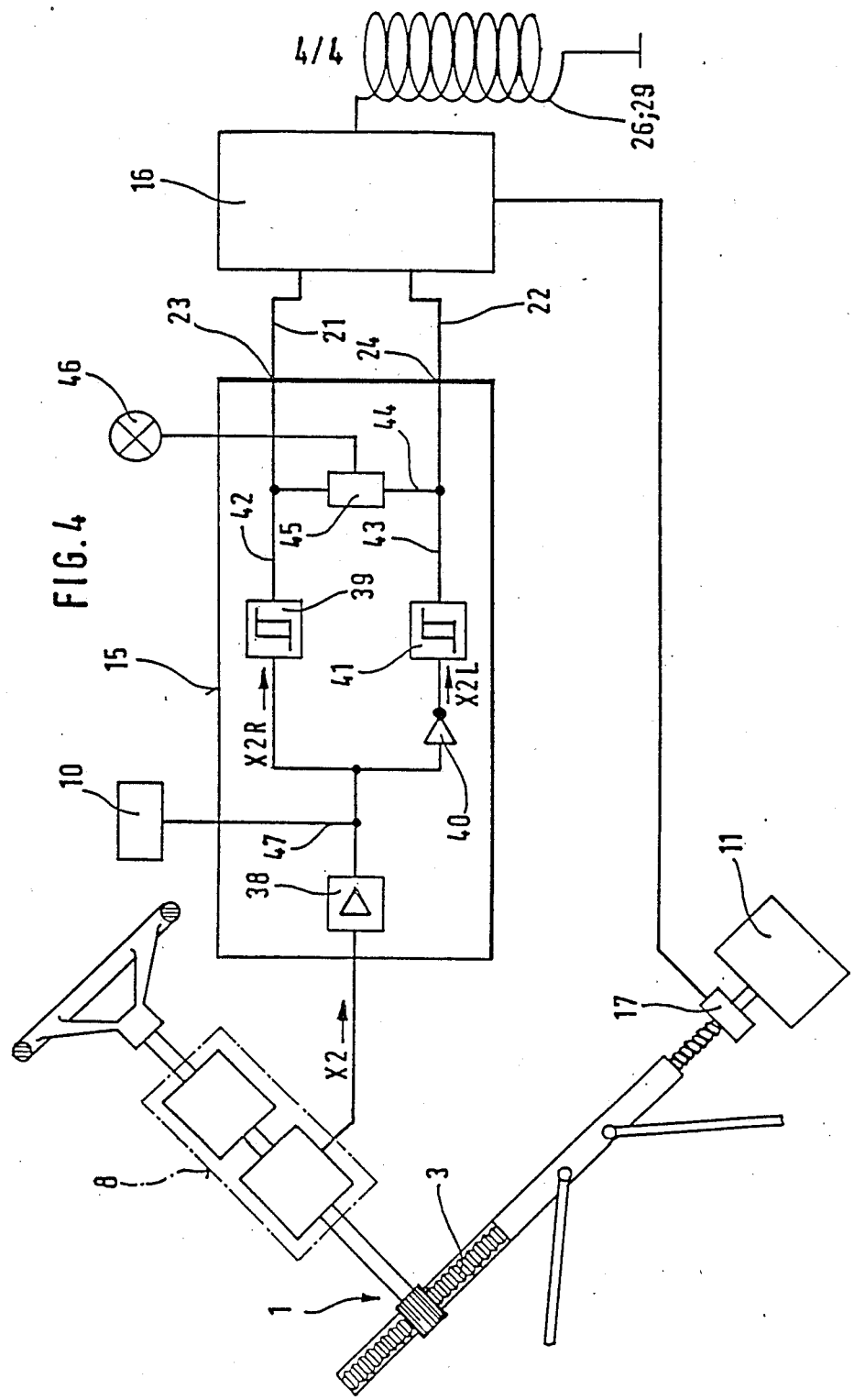
FIG. 4 shows a block wiring diagram of the safety circuit.

In FIG. 4, the construction of the safety device 15 is represented in detail. The second output signal X2 of the torque measuring device 8 is amplified by an amplifier 38. Then the signal path divides. In case of a clockwise moment at the steering wheel 5, the positive signals X2R are conveyed directly to a right Schmitt trigger 39, and in case of a counterclockwise moment, the negative signals X2L are conveyed, after passing through an inverter 40, to a left Schmitt trigger 41. The signal at any one time is fed from the Schmitt trigger 39 or 41 to the respective signal output 23 or 24. The lines 21 and 22 lead from the signal outputs 23 and 24 to the switching means 16. The signals X2R and X2L are not passed on to the signal outputs 23 and 24 until the actuation threshold of the safety device 15 established by the Schmitt triggers 39 and 41 is passed.

An AND gate 45 is located in a line 44 between the interconnecting lines 42 and 43 from the Schmitt triggers 39 and 41 to the signal outputs 23 and 24. An indicator device 46, for example, in the form of a pilot lamp, is connected with the AND gate.

An electronic monitoring device can be located between the control circuit 9 and the safety circuit 14 to further increase the safety redundancy. In addition, a safety line 47 with a comparator 48 is located between the two circuits (FIG. 3). The control circuit 9 and/or the coupling 13 can be disconnected by the comparator 48 when an incident of malfunctioning occurs. This is the case, for example, when the signals of the two circuits 9 and 14 have different directions.

The functioning of the auxiliary power steering mechanism of the invention is described in greater detail in the following.

If, when operation is trouble free, a clockwise moment is applied to the steering wheel 5 below the actuation threshold G, the control device 10 still does not deliver any current to the electric motor 11. The safety circuit 14 also does not come into action if the switching threshold of the Schmitt trigger 39 has not yet been reached. The result is that the coupling 13 or the disconnecting switch 27 remains open.

The coupling 13 or the disconnecting switch 27 is closed first when the actuation threshold of the Schmitt trigger 39 is passed. If the steering moment also still exceeds the actuation threshold G of the control device 10, an increasing current corresponding to the torque is delivered to the electric motor 1, which then exerts a clockwise moment (when connected with the pinion 2) or a corresponding force (when connected with the steering rack 3) on the steering gear 1 through the set of gears 12 and thereby eases the torque at the steering wheel 5. The clockwise motor moment causes an opening of the switch 20 through the second torque measuring device 17 which, however, has no influence on the functioning in this case.

When there is an opposite torque at the steering wheel 5 or when a force is introduced at the steering rack 3, the mechanism behaves accordingly. From a force at the steering there results a torque acting on the steering shaft 4 that drives the electric motor 11 in the opposite direction, so that a counter-force against the force introduced at the steering rack 3 is generated.

In case of malfunctioning in the electric control circuit 9, for example, it can happen that a clockwise moment is introduced at the steering wheel 5 while a counterclockwise moment originates at the electric motor 11. In this case, the switch 19 opens. The first torque measuring device 8 delivers a signal for the clockwise moment on the line 21 as a second output signal X2. However, since the switch 19 in line 21 is open, neither solenoid 26 or 29 is energized. A faulty controlling of the electric motor 11 is thus prevented. Accordingly, the driver is warned by the lack of assistance.

Another case of malfunctioning occurs when, through a defect in the control device 10, the electric motor 11 suddenly receives a signal to start without a corresponding torque being present at the steering wheel 5. Since in this case an output signal X2 generated by the first torque measuring device 8 is lacking, both signal outputs 23 and 24 of the safety device 15 have no current. Thus, no signal to close the coupling 13 or the disconnecting switch 27 goes through lines 21 and 22 of the switching means 16. Consequently no unwanted moment can be conveyed to the pinion 2 and the electric motor 11 certainly cannot start.

If, as a result of a malfunction in the control circuit 9, the electric motor 11 rotates too rapidly, it would overtake the torque at the steering wheel 5 to a certain extent, and an opposite rotating moment would arise at the first torque measuring device 8. Then the operation is as in the malfunctioning described above, in which torques in different directions are measured at the steering wheel 5 and the electric motor 11. Thus a faulty driving of the pinion 2 is also prevented.

Incidents of malfunctioning that would result in a dangerous faulty functioning of the auxiliary power steering mechanism cannot occur because of a failure of the redundant safety circuit 14. In case of a lack of signals at both signal outputs 23 and 24 of the safety device 15, the electric motor 11 is uncoupled from the steering gear 1 and the supply of current to the electric motor 11 is interrupted by the disconnecting switch 27. Then the auxiliary power steering mechanism operates as a normal mechanical steering mechanism.

If, on the other hand, signals are constantly present at one or both of the signal outputs 23 and 24, the steering mechanism operates via the control circuit 9, which, however, is then no longer monitored. However, in such malfunctioning, pilot signals are present at least for a short time at both signal outputs 23 and 24, so that both connecting lines 42 and 43 are carrying voltage simultaneously, at least for a short time. In this case, the AND gate 45 becomes active and the indicator device 46 signals a malfunctioning of the system.

I claim:

1. An auxiliary power steering mechanism for motor vehicles having an electric motor (11) assisting a hand-operated steering means (5) of a steering gear (1), a first torque-measuring means (8) for measuring a torque applied to said steering means (5) and producing two output signals X1 and X2, a control circuit (9) having an electronic control means (10) for controlling said electric motor (11) according to a first output signal (X1) from said first torque-measuring means (8), the improvement comprising a redundant safety circuit (14) including a safety means (15) and a switching means (16) for controlling a disconnecting means (13, 27) for activating and deactivating said electric motor (11) steering assist according to a second output signal (X2) from said torque-measuring means (8), a second torque-measuring means (17) for measuring the torque of said electric motor (11) disposed in the drive train between said electric motor (11) and said steering gear (1), and said switching means (16) of said safety circuit (14) operating said disconnecting means (13, 27) when the respective torques measured by said first and second torque-measuring means (8, 17) have different directions.

2. An auxiliary power steering mechanism according to claim 1, wherein said disconnecting means comprises a coupling (13) located between said electric motor (11) and said steering gear (1).

3. An auxiliary power steering mechanism according to claim 1, wherein said disconnecting means comprises an electrically operated disconnecting switch (27) located in a line (28) running from said electronic control means (10) to said electric motor (11).

4. An auxiliary power steering mechanism according to claim 1, wherein said safety means (15) comprises a signal input and two signal outputs (23, 24), one of said signal outputs delivering a pilot signal for activating said disconnecting means (13, 27) for each direction of the torque measured by said first torque-measuring means, said switching means (16) of said safety circuit (14) comprising two switches (19, 20), and said switches being closed when said second torque-measuring means (17) is in a torque-free condition, and one or the other of said switches (19, 20) being opened in response to the direction of a torque measured in said torque-measuring means (17).

5. An auxiliary power steering mechanism according to claim 4, wherein said switches (19, 20) of said switching means (16) are mechanically actuated by said second torque-measuring means (17).

6. An auxiliary power steering mechanism according to claim 1, wherein said control means (10) and said safety means (15) have different actuating thresholds, the actuating threshold of said safety means (15) lying below the actuating threshold of said control means (10).

7. An auxiliary power steering mechanism according to claim 4, wherein said safety means (15) includes a monitoring means comprising an AND gate connected between said two signal outputs (23, 24), and an indicator means (46) connected to said AND gate and being activated when both said signal outputs are active.

8. An auxiliary power steering mechanism according to claim 1, further comprising an electronic monitoring means (48) disposed between said control circuit (9) and said safety circuit (14) for switching off said control circuit (9) and/or said disconnecting means (13) when the signals of both said circuits (9, 14) have different directional values.

* * * * *